United States Patent [19]

McConnell et al.

[11] Patent Number: 5,482,977
[45] Date of Patent: Jan. 9, 1996

[54] FOAMABLE BRANCHED POLYESTERS

[75] Inventors: Richard L. McConnell, Kingsport; Kishan C. Khemani, Johnson City, both of Tenn.

[73] Assignee: Eastman Chemical Company, Kingsport, Tenn.

[21] Appl. No.: 438,120

[22] Filed: May 8, 1995

[51] Int. Cl.⁶ .................................. C08J 9/08; C08J 9/10
[52] U.S. Cl. .................. 521/81; 264/50; 264/54; 521/60; 521/79; 521/138
[58] Field of Search ................ 264/50, 54; 521/60, 521/79, 81, 138

[56] References Cited

U.S. PATENT DOCUMENTS

| | | | |
|---|---|---|---|
| 4,737,523 | 4/1988 | White et al. | 521/138 |
| 4,751,250 | 6/1988 | White et al. | 521/94 |
| 4,837,243 | 6/1989 | White et al. | 521/138 |
| 4,851,453 | 7/1989 | White et al. | 521/138 |
| 5,288,764 | 6/1988 | Rotter et al. | 521/138 |
| 5,346,846 | 8/1994 | Rotter et al. | 521/138 |
| 5,391,582 | 2/1995 | Muschietti et al. | 521/138 |
| 5,422,381 | 6/1995 | Ghatta et al. | 521/138 |

*Primary Examiner*—Morton Foelak
*Attorney, Agent, or Firm*—Cheryl J. Tubach; Harry J. Gwinnell

[57] ABSTRACT

Disclosed are branched polyester compositions having an I.V. of at least about 0.7 dl/g and a melt viscosity sufficiently high to permit foaming during extrusion or molding operations. These branched polyesters are readily foamable with a wide range of foaming agents to provide low density shaped articles, films, and sheets.

The branched polyesters comprise about 80 to about 99.9 wt % of a polyester and about 0.1 to about 20 wt % of an ethylene copolymer containing repeat units of ethylene and of a monomer selected from the group comprising acrylic acid, methacrylic acid, alkyl acrylate, alkyl methacrylate and vinyl alcohol. The polyester comprises repeat units from about 75 to 100 mol % of a dibasic acid having from about 6 to about 40 carbon atoms and 0 to about 25 mol % of a modifying dibasic acid and repeat units from about 75 to 100 mol % of a glycol having from about 2 to about 10 carbon atoms, 0 to about 25 mol % of a modifying glycol and 0 to about 25 mol % of a modifying compound selected from the group comprising amino alcohols, diamines and lactams.

16 Claims, No Drawings

FOAMABLE BRANCHED POLYESTERS

FIELD OF THE INVENTION

This invention relates to high molecular weight polyester compositions which possess high melt viscosity and melt strength and which can be foamed with a wide range of foaming agents. More particularly, this invention pertains to polyesters containing branching agents of ethylene copolymers, and to foamed articles produced therefrom.

BACKGROUND OF THE INVENTION

Many polymeric materials are foamed to provide low density articles such as films, cups, food trays, decorative ribbons, and furniture parts. For example, polystyrene beads containing low boiling hydrocarbons such as pentane are formed into lightweight foamed cups for hot drinks such as coffee, tea, hot chocolate, and the like. Polypropylene can be extruded in the presence of blowing agents such as nitrogen or carbon dioxide gas to provide decorative films and ribbons for package wrappings. Also, polypropylene can be injection molded in the presence of these blowing agents to form lightweight furniture parts such as table legs and to form lightweight chairs.

Polyesters such as poly(ethylene terephthalate) have a much higher density (e.g. about 1.3 g/cc) than other polymers. Therefore, it would be desirable to be able to foam polyester materials to decrease their weight for use in making molded parts, films, sheets, food trays, and the like. Such foamed articles also have better insulating properties than unfoamed parts. However, it is difficult to foam such polyester materials because of the low melt viscosity and low melt strength of typical poly(ethylene terephthalate) and related polyester polymers. The low melt viscosity and low melt strength of the polyesters is a problem because the polymer melt will not adequately retain the bubbles of an expanding gas during molding or extrusion operations. It would be desirable therefore to be able to provide polyester polymers which could be foamed with conventional foaming systems.

One approach to providing polyesters having high melt viscosities involves treating preformed polyesters with monomeric materials which are multifunctional carboxylic acids or polyols to provide branched polyesters. Such compositions are disclosed in U.S. Pat. Nos. 4,132,707; 4,145,466; 4,999,388; 5,000,991; 5,110,844; 5,128,383; and 5,134,028. The branching agents used include tri- and tetracarboxylic acids and anhydrides such as trimesic acid, pyromellitic acid, and pyromellitic dianhydride or polyols such as trimethylolpropane and pentaerythritol. These monomeric branching agents will provide polyesters with increased melt viscosities and melt strengths but their use is often disadvantageous. The usual method of adding the branching agent is to melt the polyester in an extruder and to add the branching agent into the melt in the barrel of the extruder. However, it is difficult to control the amount of branching agent used and to get adequate mixing and reaction before the melt exits the die.

To resolve the aforementioned problems and provide polyesters with sufficient melt strength that are easy to foam and result in excellent foamed properties, one of the inventors of the present invention disclosed in U.S. Pat. No. 5,399,595 the incorporation of small amounts of a dicarboxylic acid sulfomonomer such as sulfoisophthalic acid in a polyester composition of essentially repeat units from terephthalic or naphthalenedicarboxylic acid and an aliphatic or cycloaliphatic glycol. Such foamable polyesters are prepared by a combination of melt phase and solid state polymerization to result in a polyester composition that is ready to foam.

In an effort to control the amount of branching agent added to a polyester to improve foaming results, the inventors disclosed in U.S. patent application Ser. No. 130,816 filed Oct. 4, 1993 a branching agent concentrate that may be conveniently dry blended with polyesters, melt compounded and foamed using conventional foaming techniques. The branching agent concentrate is a melt blended composition containing a polycarboxylic acid or polyol branching agent having at least three carboxylic or hydroxyl groups and a polyolefin wherein the polyolefin acts as a physical carrier for the branching agent.

SUMMARY OF THE INVENTION

In another approach to resolve the aforementioned problems of the prior art, the inventors of the present invention additionally provide a branched polyester having increased melt viscosity and melt strength for use in producing a foamed article of excellent foamed properties, the foamed article of the branched polyester having an I.V. of at least 0.7 dl/g and a melt viscosity sufficiently high to permit foaming during extrusion or molding operations. The branched polyester comprises:

(A) about 80 to about 99.9 wt % based on the total weight of (A) and (B) of a polyester comprising:
  (1) repeat units from about 75 to 100 mol % of a dibasic acid having from about 6 to about 40 carbon atoms and 0 to about 25 mol % of a modifying dibasic acid, and
  (2) repeat units from about 75 to 100 mol % of a glycol having from about 2 to about 10 carbon atoms, 0 to about 25 mol % of a modifying glycol and 0 to about 25 mol % of a modifying compound selected from the group comprising amino alcohols, diamines, and lactams, said mol % based on 100 mol % of (1) and 100 mol % of (2);

(B) about 0.1 to about 20 wt % based on the total weight of (A) and (B) of an ethylene copolymer containing repeat units of ethylene and of a monomer selected from the group comprising acrylic acid, methacrylic acid, alkyl acrylate, alkyl methacrylate and vinyl alcohol.

According to another embodiment of the invention, there is provided a process for preparing a foamed article of a branched polyester comprising the steps of:

(a) preparing a polyester comprising
  (1) repeat units from about 75 to 100 mol % of a dibasic acid having from about 6 to about 40 carbon atoms and 0 to about 25 mol % of a modifying dibasic acid, and
  (2) repeat units from about 75 to 100 mol % of a glycol having from about 2 to about 10 carbon atoms, 0 to about 25 mol % of a modifying glycol and 0 to about 25 mol % of a modifying compound selected from the group comprising amino alcohols, diamines and lactams, said mol % based on 100 mol % of (1) and 100 mol % of (2);

(b) preparing an ethylene copolymer comprising repeat units of ethylene and of a comonomer selected from the group comprising acrylic acid, methacrylic acid, alkyl acrylate, alkyl methacrylate and vinyl alcohol;

(c) drying the polyester and ethylene copolymer;

(d) forming a melt comprising about 80 to about 99.9 wt % of the dried polyester and about 0.1 to about 20 wt % of the dried ethylene copolymer;

(e) cooling and transforming the melt into solid particulates;

(f) solid state polycondensing the particulates until a branched polyester having an I.V. of at least about 0.70 is obtained;

(g) melting the branched polyester particulates;

(h) adding a blowing agent to the branched polyester melt; and (i) extruding the composition of step (h) through a die.

DESCRIPTION OF THE INVENTION

Certain polymeric materials containing multiple hydroxyl, carboxylic acid or ester groups have now been found to be useful as branching agents for polyesters and polyesteramides to cause an increase in their melt viscosity and melt strength resulting in improved foamability. Suitable polymeric materials include copolymers of ethylene with monomers of either acrylic acid, methacrylic acid, alkyl acrylates, alkyl methacrylates or vinyl alcohol. The concentration of the ethylene copolymer branching agents is generally in the range of about 0.1 to about 20 weight percent (wt %) based on the total weight of the ethylene copolymer and polyester composition. An ethylene copolymer content of less than 10 wt % is preferred.

The content of the monomers of acrylic acid, methacrylic acid, alkyl acrylates, and alkyl methacrylates in the ethylene copolymers is generally in the range of about 0.5 to about 40 wt % and preferably less than 20 wt %. These ethylene copolymers have melt index values of about 0.1 to about 200 g/10 min. (ASTM D-1238-56T). For the ethylene copolymers containing alkyl acrylates or alkyl methacrylates, the alkyl groups will generally contain 1 to about 4 carbon atoms.

For the ethylene/vinyl alcohol copolymer the content of the vinyl alcohol ranges from about 1 to about 95 wt %. This copolymer is readily prepared by the hydrolysis of ethylene/vinyl acetate copolymers and it is desirable that the residual acetate moieties be quite low (e.g. less than about 1 or 2 wt %). The melt index of this copolymer will generally be in the range of about 0.1 to about 200 gm/10 min.

The ethylene copolymers are typically stabilized using small amounts of antioxidants. For example, about 0.05 to about 0.1 wt % of Irganox 1010, Irganox 1076, Ethanox 330 and the like may be used. In addition, small amounts of other stabilizers such as dilauryl thiodipropionate and Weston 619 may be used in combination with the above named stabilizers.

A wide range of polyester polymers are useful in this invention and include polyesters derived from dibasic acids containing about 6 to about 40 carbon atoms and glycols containing about 2 to about 10 carbon atoms. These polyesters will generally have inherent viscosity (I.V.) values in the range of about 0.4 to about 0.70 (measured in a 60/40 phenol/tetrachloroethane solution) and are generally crystallizable. The polyesters may be in any form including homopolymers, copolymers, modified polymers, branched polymers, and blends.

Preferred dibasic acids for preparing the polyesters include terephthalic acid, isophthalic acid, naphthalenedicarboxylic acid, cyclohexanedicarboxylic and the like or their alkyl esters. When naphthalenedicarboxylic acid is used, it may be any of the various isomers but the preferred ones include the 2,6-, 2,7-, 1,5-, and 1,6-isomers. Mixtures of the various isomers may also be used. The preferred isomers of cyclohexanedicarboxylic acid are the 1,3- or 1,4-isomers, and may be cis-, trans or a mixture of cis/trans isomers.

Preferred glycols include ethylene glycol, 1,4-butanediol, 1,4-cyclohexanedimethanol and the like. When cyclohexanedimethanol is used, it may be the 1,3- or 1,4-isomers and may be cis-, trans- or a mixture of cis/trans isomers.

The polyester copolymers, i.e. copolyesters, may contain up to about 25 mol % of other dibasic acids or glycols. Modifying dibasic acids (in addition to those named above) include oxalic, succinic, glutaric, adipic, sebacic, suberic, dimer, sulfoisophthalic, or its metal salts, and the like. When enumerating any of the aforementioned acids, it should be understood that use of their corresponding acid anhydrides, esters, and acid chlorides is included. Modifying glycols (in addition to those named above) include 1,6-hexanediol, neopentyl glycol, 2,2,4,4-tetramethyl-1,3-cyclobutanediol and the like.

Polyesteramides may also be used in the practice of this invention. Such polymers would contain the dibasic acid and glycol moieties as cited above. In addition, the glycol moiety would contain up to about 25 mol % of a modifying compound of an aminoalcohol, a diamine, and/or a lactam. Some suitable compounds include 4-aminomethylcyclohexanemethanol, hexamethylenediamine, caprolactam and the like materials.

The polyesters in their various forms, polyesteramides and ethylene copolymers are readily made by conventional polymerization techniques well known in the art.

A combination of melt compounding and solid state polycondensation is used to accomplish the branching reactions of the ethylene copolymers with the polyesters forming branched polymeric polyesters which exhibit increased melt viscosity and melt strength relative to polyesters that have not been branched with polymeric materials, The effect of branching is to provide polyesters with significantly improved foamability and blow molding characteristics.

In the preferred embodiment of the process the ethylene copolymer is dry blended with the polyester, dried in vacuum or convection ovens and then melt compounded in an extruder at temperatures in the range of about 260° C. to about 300° C. Optionally, the ethylene copolymer and polyester may be separately dried and fed into the extruder. The extrudate is formed into solid particulates and dried. Any form of particulate may be used including pellets, granules, powders, or chips. The particulates are then processed in a solid state polycondensation unit by circulating or blowing an inert gas, such as nitrogen, through the pellets at temperatures in the range of about 200° C. to about 230° C. This solid state polycondensation reaction is continued until the inherent viscosity of the polymer blend reaches a value of at least about 0.70 dl/g and preferably a value of about 0.90 dl/g.

The combination of melt compounding and solid state polycondensation is employed because polymerization in the melt phase to high molecular weight polyesters is significantly limited by the substantial increase in melt viscosity of the branched polyesters. The melt eventually reaches a melt viscosity that is difficult to handle. Further, in conventional extruders used for melt compounding the reaction time is limited due to the size of the extruder. Generally not enough time lapses to allow for sufficient branching reactions to occur.

The resulting polymer is a ready-to-use branched polyester that is in a convenient form for processing into foamed end products. The branched polyester may be directly added to an extruder for melting and mixing with a blowing agent or first dry blended with other ingredients prior to melting to enhance the performance properties of the end products. A variety of end uses is contemplated including the manufacture of films, tubes, blow molded objects, extrusion coated materials, food packaging containers, and injection molded parts.

The branched polyester has a melt viscosity of above 5000 poise at 280° C. and a melt strength of above −50% which are typical values for certain non-branched polyesters such as poly(ethylene terephthalate) (PET). Preferably, the melt viscosity is in the range of about 20,000 to 200,000 poise at 280° C. and the melt strength is in the range of about −25 to +60% these being excellent properties for foaming. Both melt viscosity and melt strength are measured at 280° C.

A wide variety of methods are available for foaming the branched polyester. These include the injection of an inert gas such as nitrogen or carbon dioxide into the melt during extrusion or molding operations. Inert hydrocarbon gases such as methane, ethane, propane, butane, and pentane, or chlorofluorocarbons, hydrochlorofluorocarbons and the like may also be used. Another method involves the dry blending of organic blowing agents with the branched polyester and then extrusion or molding the compositions to provide foamed articles. During the extrusion or molding operation, an inert gas such as nitrogen is released from the blowing agents and provides the foaming action. Typical blowing agents include azodicarbonamide, hydrazocarbonamide, dinitrosopentamethylenetetramine, p-toluenesulfonyl hydrazodicarboxylate, 5-phenyl-3,6-dihydro-1,3, 4-oxadiazin-2-one, sodium borohydride, sodium bicarbonate, 5-phenyltetrazole, p,p'-oxybis (benzenesulfonylhydrazide), and the like. Still another method involves the blending of sodium carbonate or sodium bicarbonate with one portion of the branched polyester particulates, the blending of an organic acid such as citric acid with another portion of branched polyester particulates and then a blend of the two types of particulates are extruded or molded at elevated temperatures. Carbon dioxide gas released from the interaction of the sodium carbonate and citric acid provide for the foaming action in the melt.

In particular when using ethylene copolymers of alkyl acrylates or alkyl methacrylates as the branching agent, the lower alkyl groups are liberated as volatile alcohols during foaming. This further enhances the desired foaming action.

Patents disclosing various foaming procedures and equipment include U.S. Pat. Nos. 5,116,881; 5,134,028; 4,626,183; 5,128,383; 4,746,478; 5,110,844; 5,000,991; and 4,761,256. Other background information on foaming technology may be found in Kirk-Othmer Encyclopedia of Chemical Technology, Third Edition, Volume 11, pp 82–145 (1980), John Wiley and Sons, Inc., New York, N.Y., and the Encyclopedia of Polymer Science and Engineering, Second Edition, Volume 2, pp 434–446 (1985), John Wiley and Sons, Inc., New York, N.Y.

Many ingredients that may be added to the branched polyesters to enhance their performance properties include buffers, antioxidants, metal deactivators, colorants, phosphorus stabilizers, impact modifiers, nucleating agents, ultraviolet light and-heat stabilizers, and the like. All of these additives and the use thereof are well known in the art and do not require extensive discussions. Therefore, only a limited number will be referred to, it being understood that any of these compounds can be used so long as they do not hinder the performance of the branched polyesters.

In many cases, nucleating agents such as talc, $TiO_2$, or small amounts of polyolefin materials such as polyethylene, polypropylene, ethylene, or propylene copolymers and the like are beneficial additives for the foamable branched polyester compositions. Certain nucleating agents are important to create sites for bubble initiation and to influence the cell size of the foamed sheet or foamed object.

Other desirable additives include impact modifiers and antioxidants. Examples of typical commercially available impact modifiers well-known in the art and useful in this invention include ethylene/propylene terpolymers, styrene based block copolymers, and various acrylic core/shell type impact modifiers. The impact modifiers may be used in conventional amounts of from 0.1 to 25 weight percent of the overall composition and preferably in amounts from 0.1 to 10 weight percent of the composition. Examples of typical commercially available antioxidants useful in this invention include, but are not limited to, hindered phenols, phosphites, diphosphites, polyphosphites, and mixtures thereof. Combinations of aromatic and aliphatic phosphite compounds may also be included.

This invention will be further illustrated by a consideration of the following examples, which are intended to be exemplary of the invention. All parts and percentages in the examples are on a weight basis unless otherwise stated. The materials and testing procedures used for the results shown herein in the examples are as follows:

Inherent viscosity (I.V.) is measured at 25° C. using 0.50 grams of polymer per 100 mL of a solvent Consisting of 60% by weight phenol and 40% by weight tetrachloroethane.

Melt Strength and Die Swell are determined according to ASTM D3835 measured at 280° C. by extruding the molten polyester downward through a die 0.1 inch in diameter and 0.25 inches long at a shear rate of 20 second$^{-1}$ using an Instron rheometer and allowing the extrudate to fall freely. Die Swell is determined by measuring the diameter of the extrudate immediately outside the orifice and dividing by the diameter of the orifice. Die Swell is reported as percent Die Swell. The diameter of the end of a six inch length of extrudate, measured from the orifice of the die, is measured. The percent Melt Strength is determined from the formula:

$$\frac{D - 0.1}{0.1} \times 100$$

wherein D is the diameter, in inches, of the extrudate supporting a six inch length of extrudate. If D is less than 0.1 inch, the Melt Strength is a negative number since there is no increase in the diameter of the extrudate. If D is greater than 0.1 inch, the Melt Strength is a positive number.

Melt viscosity is measured according to ASTM D4440 at zero shear and 280° C.

The mol percentages of the diol and acid residues are determined by gas chromatography or NMR.

EXAMPLE 1

Dried pellets of poly(ethylene terephthalate) (PET) (I.V. 0.60), dried pellets of ethylene/vinyl alcohol copolymer (EVOH) (32 wt % ethylene; melt index 0.7) and talc are thoroughly mixed in a stainless steel vessel to provide a blend containing 5 wt % EVOH and 0.5 wt % of talc. The pellet blend is fed to an extruder and mixed in the melt at 275° C. The melt is extruded through a rod die and the rod is chopped into ⅛ inch pellets. These dried pellets are then submitted to solid state polycondensation conditions in a 1.25 inch diameter glass column. The column is jacketed to allow solvents to be refluxed thereby providing heat to the column. The temperature of the column is maintained at 198° C. using refluxing ethylene glycol. The bottom of the column has a fritted glass surface to allow inert gases to pass up through the column. Nitrogen is passed through the polymer pellets at a rate of 4 cubic feet per hour to remove evolved ethylene glycol and other volatile components as the polymer I.V. increased. In 18 hours, the polymer sample has an I.V. of 0.81. The melt strength of this sample is −16.5%, die swell is +29.5%, and melt viscosity is 58,000 poise at 280° C. The starting poly(ethylene terephthalate) sample has a melt strength of -105%, a die swell of −30% and a melt viscosity of 5000 poise at 280° C.

A large batch of a branched polyester similar to the above was made in an appropriately scaled-up solid-stating unit.

Samples of the blend, now converted to a branched polyester, are fed into a tandem extruder consisting of a 2 inch primary extruder which is capable of injecting a gaseous blowing agent under high pressure into the polymeric melt, a 2.5 inch secondary extruder which allows the melt to foam under reduced pressure, and an annular die (3 inch diameter) located at the end of the second extruder through which the extrudate passes. The two extruders are connected through a well known low pressure crossover zone. The gaseous blowing agent used is isopentane. The extruders, the crossover zone and the annular die are heated at 260° C. and 274° C. through their entire length as noted below:

2 inch primary extruder=260° C.

Crossover zone=260° C.

2.5 inch secondary extruder=260° C.

Annular 3 inch die=274° C.

Other relevant extrusion conditions and parameters are as follows:

| Pressures (psi) | |
| --- | --- |
| 2 inch extruder | 5600–6000 |
| Crossover zone | 3740–3860 |
| 2.5 inch extruder | 2210–2230 |
| Isopentane injection | 3250–5600 |
| Extrusion Rates | |
| 2 inch extruder | 87 rpm |
| 2.5 inch extruder | 16.4 rpm |
| Polymer output | 66 lb./hour |
| Isopentane injected | 1.6 lb./hour |

Under these conditions, the branched PET composition described above is extruded with the desired characteristics needed to produce good foam. The foam coming from the annular die has a dry hand and good melt strength so that it may be readily stretched over a water cooled mandrel. The foam is slit and collected as a sheet 36 inches wide.

The thickness and density of the foam responds well to changes in the line-speed and isopentane level. The foam produced has a density of 0.21 g/cc at a thickness of 59 mils, an I.V. of 0.80 and a crystallinity of 15.3% as measured by DSC. Scanning Electron Microscopy and Confocal Light Microscopy show the cell structure to be well formed with all cells being closed and of 100–200 μm diameter in size. The foam exhibits the following good post-expansion properties:

(a) A small piece of the foam produced above is immersed in boiling water for 2 minutes and then cooled to room temperature. Its thickness is measured using a FOWLER micrometer at several points along the foam surface and the average thickness is 91 mils, which is a 54% increase from the as-produced foam. The density of this post-expanded foam is measured to be 0.11 g/cc. It has a crystallinity of 31.26% as measured by DSC. Scanning Electron Microscopy and Confocal Light Microscopy show the cell structure to be well formed with all cells being closed and of 200–400 μm diameter in size.

(b) A small piece of the foam is also post-expanded in a conventional air-oven at 175° C. for 3 minutes. This foam has an average thickness of 75 mils, and a density of 0.16 g/cc. It has a crystallinity of 31.53% as measured by DSC. Scanning Electron Microscopy and Confocal Light Microscopy show the cell structure to be well formed with all cells being closed and of 200–300 μm diameter in size.

Similarly, good foaming results are achieved with the following modifications to the above described example:

(a) PET/EVOH blends are used containing 0.3, 1, 3 and 5 wt % of the EVOH copolymer.

(b) Nitrogen or carbon dioxide gas is used instead of the isopentane as the blowing agent.

(c) The branched PET is dusted with 2 wt % of the chemical blowing agent azodicarbonamide prior to the extrusion process instead of using the isopentane blowing agent.

(d) A combination of a chemical blowing agent and a gas blowing agent is used by dusting the branched PET with 0.5 wt % of the chemical blowing agent azodicarbonamide prior to the extrusion process, and then using the isopentane blowing agent during the extrusion process as described above.

Similarly, good results are achieved using 5 wt % of an ethylene/acrylic acid copolymer containing 8 wt % acrylic acid (CAS No. 9010-77-9) instead of the EVOH copolymer.

EXAMPLE 2

The procedure of Example 1 is repeated using a branched poly(ethylene terephthalate) polyester containing 0.3 mol % trimellitic anhydride (I.V. 0.68), 1 wt % of EVOH copolymer of Example 1 and 0.5 wt % $TiO_2$. The foam produced has a dry hand and good cell structure. Similarly, good results are achievable when foaming branched poly(ethylene terephthalate) copolyester containing 0.2 mol % of either trimellitic acid or pyromellitic dianhydride with the EVOH copolymer.

EXAMPLE 3

The procedure of Example 1 is repeated using a poly(ethylene terephthalate) copolyester containing 3.5 mol % of 1,4-cyclohexanedimethanol (I.V. 0.69), 5 wt % of an EVOH copolymer (95 wt % ethylene; melt index 4.2), 1.0 wt % sodium carbonate and 0.5 wt % talc. The foam produced has a dry hand and good, uniform cell structure.

EXAMPLE 4

The procedure of Example 1 is repeated using poly (1,4-cyclohexyleinedimethylene terephthalate) (I.V. 0.68), 3 wt % of an ethylene/methyl acrylate copolymer (20 wt % methyl acrylate; melt index 6.0) and 1 wt % talc. The foam produced has a dry hand and a good, uniform cell structure. Similarly, good results are achievable when 0.5 wt % of the ethylene/methyl acrylate copolymer is used.

EXAMPLE 5

The procedure of Example 1 is repeated using a poly(ethylene terephthalate) copolyester containing 9 mol % 1,4-cyclohexanedimethanol (I.V. 0.55), 2 wt % of an ethylene/methyl methacrylate copolymer (15 wt % methyl methacrylate; melt index 10.1) and 0.5 wt % $TiO_2$. The foam produced has a dry hand and good, uniform cell structure. Similarly, good results are achievable using poly(ethylene terephthalate) copolyesters containing 17 mol % diethylene glycol (I.V. 0.65).

EXAMPLE 6

The procedure of Example 1 is repeated using a poly(1,4-cyclohexylenedimethylene terephthalate) copolyester containing 15 mol % ethylene glycol (I.V. 0.68), 1 wt % of an ethylene/acrylic acid copolymer (88 wt % ethylene; melt index 7.2), 0.5 wt % sodium carbonate, and 0.5 wt % $TiO_2$. The foam produced has a dry hand and good, uniform cell structure. Similarly, good results are achievable when poly(1,4-cyclohexylenedimethylene terephthalate) copolymers containing 5 mol % isophthalic acid (I.V. 0.69), 17 mol % isophthalic acid (I.V. 0.67) or 10 mol % 2,6-naphthalenedicarboxylic acid (I.V. 0.65) are used, as well as when a poly(ethylene terephthalate) copolyesteramide containing 5 mol % of 4-aminomethylcyclohexanemethanol is used.

EXAMPLE 7

The procedure of Example 1 is repeated using a poly(ethylene 2,6-naphthalenedicarboxylate) (I.V. 0.68), 5 wt % of an EVOH copolymer (90 wt % ethylene; melt index 1.3) and 2 wt % talc. The foam produced has a dry hand and good, uniform cell structure. Similarly, good foaming results are achievable when dusting the branched polyester with 2 wt % of the chemical blowing agent azodicarbonamide prior to the extrusion process instead of using the isopentane blowing agent.

The invention has been described in detail with particular reference to preferred embodiments thereof, but it will be understood that variations and modifications can be effected within the spirit and scope of the invention.

We claim:

1. A process for preparing a foamed article of a branched polyester comprising the steps of:
   (a) preparing a polyester comprising
      (1) repeat units from about 75 to 100 mol % of a dibasic acid having from about 6 to about 40 carbon atoms and 0 to about 25 mol % of a modifying dibasic acid, and
      (2) repeat units from about 75 to 100 mol % of a glycol having from about 2 to about 10 carbon atoms, 0 to about 25 mol % of a modifying glycol and 0 to about 25 mol % of a modifying compound selected from the group comprising amino alcohols, diamines and lactams, said mol % based on 100 mol % of (1) and 100 mol % of (2);
   (b) preparing an ethylene copolymer comprising repeat units of ethylene and of a comonomer selected from the group comprising acrylic acid, methacrylic acid, alkyl acrylate, alkyl methacrylate and vinyl alcohol;
   (c) drying the polyester and ethylene copolymer;
   (d) forming a melt comprising about 80 to about 99.9 wt % of the dried polyester and about 0.1 to about 20 wt % of the dried ethylene copolymer;
   (e) cooling and transforming the melt into solid particulates;
   (f) solid state polycondensing the particulates until a branched polyester having an I.V. of at least about 0.70 is obtained;
   (g) melting the branched polyester particulates;
   (h) adding a blowing agent to the branched polyester melt; and
   (i) extruding the composition of step (h) through a die.

2. The process as recited in claim 1 wherein step (a) the polyester is prepared with the dibasic acid selected from the group comprising terephthalic acid, isophthalic acid, naphthalenedicarboxylic acid, cyclohexanedicarboxylic acid, and alkyl esters and mixtures thereof.

3. The process as recited in claim 2 wherein step (a) the polyester is prepared with the naphthalenedicarboxylic acid selected from the group of isomers comprising 2,6-, 2,7-, 1,5-, and 1,6-naphthalenedicarboxylic acid and mixtures thereof.

4. The process as recited in claim 2 wherein step (a) the polyester is prepared with the cyclohexanedicarboxylic acid selected from the group of isomers comprising 1,3-, 1,4-, cis-, and trans-cyclohexanedicarboxylic acid and mixtures thereof.

5. The process as recited in claim 1 wherein step (a) the polyester is prepared with the glycol selected from the group comprising ethylene glycol, 1,4-butanediol, and 1,4-cyclohexanedimethanol.

6. The process as recited in claim 1 wherein step (a) the polyester is prepared with the modifying dibasic acid selected from the group comprising terephthalic acid, isophthalic acid, naphthalenedicarboxylic acid, cyclohexanedicarboxylic acid, oxalic acid, succinic acid, glutaric acid, adipic acid, sebacic acid, suberic acid, dimer acid, sulfoisophthalic acid and mixtures thereof.

7. The process as recited in claim 1 wherein step (a) the polyester is prepared with the modifying glycol selected from the group comprising ethylene glycol, 1,4-butanediol, 1,4-cyclohexanedimethanol, 1,6-hexanediol, neopentyl glycol, 2,2,4,4-tetramethyl-1,3-cyclobutanediol and mixtures thereof.

8. The process as recited in claim 1 wherein step (a) the polyester is prepared with the modifying compound selected from the group comprising 4-aminomethylcyclohexanemethanol, hexamethylenediamine, and caprolactam.

9. The process as recited in claim 1 wherein step (b) the ethylene copolymer is prepared containing from about 0.5 to about 40 wt % of the comonomer selected from the group comprising acrylic acid, methacrylic acid, alkyl acrylate and alkyl methacrylate.

10. The process as recited in claim 9 wherein step (b) the ethylene copolymer is prepared containing less than 20 wt % of the comonomer.

11. The process as recited in claim 1 wherein step (b) the ethylene copolymer is prepared containing from about 1 to about 95 wt % vinyl alcohol.

12. The process as recited in claim 1 wherein step (b) the ethylene copolymer is prepared with the alkyl acrylates and alkyl methacrylates containing alkyl groups having about 1 to about 4 carbon atoms.

13. The process as recited in claim 1 wherein step (d) the melt is formed comprising less than 10 wt % of the ethylene copolymer.

14. The process as recited in claim 1 wherein step (f) the solid state polycondensing continues until the branched polyester has an I.V. of at least 0.90.

15. The process as recited in claim 1 wherein step (g) the branched polyester is melted having a melt viscosity of above 5000 poise and a melt strength of above (−50) percent, both being measured at 280° C.

16. The process as recited in claim 15 wherein step (g) the branched polyester is melted having a melt viscosity from about 20,000 to about 200,000 poise at 280° C. and a melt strength from about (−25) to about (+60) percent, both being measured at 280° C.

* * * * *

UNITED STATES PATENT AND TRADEMARK OFFICE
CERTIFICATE OF CORRECTION

PATENT NO. : 5,482,977
DATED : January 9, 1996
INVENTOR(S) : Richard L. McConnell, et al.

It is certified that error appears in the above-indentified patent and that said Letters Patent is hereby corrected as shown below:

Columns 9 & 10
Claim 1, lines 11 and 12; Claim 1, lines 16 and 17; Claim 2, lines 2 and 3; Claim 5, lines 2 and 3; Claim 6, line 3; Claim 7, lines 2 and 3; Claim 8, lines 2 and 3; and Claim 9, lines 3 and 4; each occurrence of "selected from the group comprising" should read --- selected from the group consisting of ---.

Column 10
Claim 3, line 3; and Claim 4, line 3; each occurrence of "selected from the group of isomers comprising" should read --- selected from the group of isomers consisting of ---.

Signed and Sealed this

Twenty-eighth Day of January, 1997

Attest:

BRUCE LEHMAN

Attesting Officer    Commissioner of Patents and Trademarks